US009141252B2

(12) United States Patent
Caruso et al.

(10) Patent No.: US 9,141,252 B2
(45) Date of Patent: Sep. 22, 2015

(54) WEB-BASED ARCHITECTURAL COLOR SELECTION SYSTEM

(75) Inventors: Christopher Caruso, Pittsburgh, PA (US); Jeffrey Lipniskis, Sarver, PA (US); Phillip J. Behrens, McDonald, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 102 days.

(21) Appl. No.: 13/342,391

(22) Filed: Jan. 3, 2012

(65) Prior Publication Data
US 2012/0170840 A1 Jul. 5, 2012

Related U.S. Application Data

(60) Provisional application No. 61/429,642, filed on Jan. 4, 2011.

(51) Int. Cl.
| | |
|---|---|
| G06K 9/00 | (2006.01) |
| G09G 5/02 | (2006.01) |
| G06K 9/40 | (2006.01) |
| G06F 3/048 | (2013.01) |
| G06F 17/30 | (2006.01) |

(Continued)

(52) U.S. Cl.
CPC ............... G06F 3/048 (2013.01); G01J 3/462 (2013.01); G01J 3/463 (2013.01); G01J 3/52 (2013.01); G06F 17/3025 (2013.01); G06T 11/001 (2013.01)

(58) Field of Classification Search
USPC ............ 382/162, 165; 345/593, 594
See application file for complete search history.

(56) References Cited

U.S. PATENT DOCUMENTS

| | | | | |
|---|---|---|---|---|
| 5,537,228 | A | * | 7/1996 | Dillinger ................. 358/502 |
| 5,761,392 | A | * | 6/1998 | Yacoub et al. ............ 358/1.9 |

(Continued)

FOREIGN PATENT DOCUMENTS

| | | |
|---|---|---|
| JP | 2001-209784 | 8/2001 |
| JP | 2003108865 | 9/2001 |

(Continued)

OTHER PUBLICATIONS

Jay Joichi: "Improving Color Exploration and Visualization on the ColorSmart by BEHR™, Application", Proceeding DUX '05 Proceedings of the 2005 Conference on Designing for User Experience Article No. 4, Jan. 1, 2005, retrieved from the Internet: URL:http://delivery.acm.org/10.1145/1140000/1138240/a4-joichi.pdf?ip=145.64.134.245&acc-ACTIVE.

(Continued)

*Primary Examiner* — Matthew Bella
*Assistant Examiner* — Jose M Torres
(74) *Attorney, Agent, or Firm* — Jonathan Parks (57) ABSTRACT

A computer implemented method includes: providing a database of digital images of colors and metadata related to the colors; using one or more search criteria to identify one or more of the digital image colors; displaying the digital images of the identified colors; selecting a color of interest from the displayed colors; using the metadata to identify additional information related to the color of interest; displaying the digital image of the selected color and the additional information; and using the displayed digital image of the selected color and the additional information to make a final color selection. An apparatus that can be used to implement the method is also provided.

30 Claims, 9 Drawing Sheets

(51) Int. Cl.
  *G06T 11/00* (2006.01)
  *G01J 3/52* (2006.01)
  *G01J 3/46* (2006.01)

(56) References Cited

U.S. PATENT DOCUMENTS

| | | | |
|---|---|---|---|
| 6,014,221 A | 1/2000 | Plude, Jr. | |
| 6,122,391 A * | 9/2000 | Ringland et al. | 382/100 |
| 6,563,510 B1 | 5/2003 | Rice et al. | |
| 6,628,829 B1 | 9/2003 | Chasen | |
| 6,727,925 B1 * | 4/2004 | Bourdelais | 715/852 |
| 6,772,151 B1 | 8/2004 | Johnston et al. | |
| 6,870,544 B2 * | 3/2005 | Blanchard et al. | 345/589 |
| 6,914,613 B2 | 7/2005 | Marchand et al. | |
| 6,973,211 B2 | 12/2005 | McClanahan et al. | |
| 6,977,650 B2 | 12/2005 | Voye et al. | |
| 6,999,615 B2 | 2/2006 | McClanahan et al. | |
| 7,187,386 B2 | 3/2007 | Rice et al. | |
| 7,193,632 B2 | 3/2007 | Rice et al. | |
| 7,230,629 B2 | 6/2007 | Reynolds et al. | |
| 7,277,572 B2 * | 10/2007 | MacInnes et al. | 382/154 |
| 7,330,585 B2 | 2/2008 | Rice et al. | |
| 7,474,314 B2 | 1/2009 | Minchew et al. | |
| 7,605,824 B2 | 10/2009 | Reynolds et al. | |
| 7,743,055 B2 * | 6/2010 | Rodrigues et al. | 707/722 |
| 7,999,825 B2 | 8/2011 | Webb et al. | |
| 8,319,788 B2 * | 11/2012 | Buzyn et al. | 345/594 |
| 8,427,498 B2 * | 4/2013 | Ou et al. | 345/594 |
| 2001/0034668 A1 * | 10/2001 | Whitworth | 705/27 |
| 2001/0041966 A1 | 11/2001 | Corrigan et al. | |
| 2003/0216972 A1 | 11/2003 | Gotou | |
| 2006/0001677 A1 * | 1/2006 | Webb et al. | 345/594 |
| 2008/0299521 A1 * | 12/2008 | Taylor et al. | 434/98 |
| 2009/0295823 A1 * | 12/2009 | Henry | 345/593 |
| 2010/0194776 A1 | 8/2010 | Chong et al. | |
| 2010/0235400 A1 | 9/2010 | Myers et al. | |
| 2010/0262551 A1 | 10/2010 | Caruso et al. | |
| 2011/0170770 A1 | 7/2011 | Remedios | |

FOREIGN PATENT DOCUMENTS

| | | |
|---|---|---|
| JP | 2002-230083 | 8/2002 |
| JP | 2003-016150 | 1/2003 |
| JP | 2003016150 | 1/2003 |
| JP | 2003-108865 | 4/2003 |
| JP | 2006504969 | 2/2006 |
| JP | 2014510322 | 4/2014 |
| WO | WO 9220024 A1 * | 11/1992 |
| WO | 2004/042336 A1 | 5/2004 |
| WO | 2009/009745 A1 | 1/2009 |

OTHER PUBLICATIONS

Reasons for Refusal for Japanese Patent Application JP2014-510322. Mailed Aug. 12, 2014.

* cited by examiner

WEB-BASED ARCHITECTURAL COLOR SELECTION SYSTEM

CROSS-REFERENCE TO RELATED APPLICATION

This patent application claims the benefit of U.S. Provisional Patent Application Ser. No. 61/429,642 filed Jan. 4, 2011, and titled "Web-Based Color Selection System," which is incorporated herein by reference.

FIELD OF THE INVENTION

This invention relates to systems and methods for selecting colors.

BACKGROUND OF THE INVENTION

There are many industries in which color selection of paint is relevant, including the architectural coatings, automotive OEM, and aerospace businesses, as well as many industrial businesses; industrial businesses that deal with consumer goods have a particular interest in color selection, such as appliances, metallic office furniture, motorcycles, and consumer electronics including cell phones, MP3 players, and the like.

The current process for the selection of a color for the purpose of painting an interior or exterior of a building entails the use of color stripe cards and/or color sample jars, the use of which requires the individual making the color selection to either travel to a location to retrieve these items or to order them and have them shipped to a specified location. This causes a significant delay in the overall process of purchasing and applying paint.

Various known systems currently enable a consumer to select a paint color based upon a color shown on a computer display. In addition, color confidence tools such as color visualization aid the consumer in the color selection process. These methods alone, however, are limited by the accuracy of the users computer display thereby causing some doubt regarding a color choice in the consumer's mind.

Improved methods and apparatus for selecting and/or matching color are desired.

SUMMARY OF THE INVENTION

A computer implemented method includes: providing a database of digital images of colors and metadata related to the colors; using one or more search criteria to identify one or more of the digital image colors; displaying the digital images of the identified colors; selecting a color of interest from the displayed colors; using the metadata to identify additional information related to the color of interest; displaying the digital image of the color of interest and the additional information; and using the displayed digital image of the color of interest and the additional information to make a final color selection.

In various embodiments, the method can include visualization of the color; purchase of color samples/gallons; and/or linkages to home décor matching/coordinating with the selected color.

An apparatus includes a memory for storing a database of digital images of colors and metadata related to the colors; a processor configured to receive search criteria transmitted from a user over a network and to use the search criteria to identify one or more of the digital image colors; and a user interface for displaying the digital images of the identified colors and for selecting a color of interest from the displayed colors; wherein the processor uses the metadata to identify additional information related to the color of interest; and the user interface displays the digital image of the color of interest and the additional information.

In various embodiments, the processor can be configured to enable visualization of the color; purchase of color samples/gallons; and/or linkages to home décor matching/coordinating with the selected color.

DETAILED DESCRIPTION OF THE INVENTION

In one aspect, a method and apparatus are provided to address the limitations and/or other deficiencies in the art by enabling the consumer to use digital representations of a color (e.g., digital images of the color) as well as additional information pertaining to each color, such as metadata and the like, to make a color selection decision. As used in this description, a consumer (also called a user) includes anyone who purchases, uses, specifies, and/or selects paint or colors. The metadata pertaining to the color could include, but is not limited to: color family (i.e., red, green, blue, etc.); color group (i.e., clean, muted, shaded, pure); and color popularity based upon how much that color has been purchased in the past. In certain embodiments, the additional information regarding a specific color can include other colors that have been preselected to coordinate with a selected color; photographs of interior or exterior images where the selected color has been previously used; and/or other home décor items including, for example, carpet, wallpaper and fabrics that may match or coordinate with the selected color.

The digital representation of the color and the additional information such as metadata are stored in a database. A software program on a computer or other information processing device can be used to display, search and sort the colors based upon the information/metadata thereby enabling the consumer to focus less on the accuracy of the color on their monitor (or other display) and more on the data about the specific color that they have in mind. This software program can enable the viewing of all colors in a specific color collection or palette; the zooming in and out of the palette to view specific colors; and the selection of search criteria that would result in the retrieval and displaying of only those colors meeting the search criteria. In addition, once a specific color (e.g., a color of interest) has been identified, the software can enable the user to take one or more different actions based upon the identified color including: the visualization of the color using a color visualization software program; the display of digital representations (or images) of matching or coordinating home décor items; the display of digital photographs of interior or exterior images where the color has been applied; the purchase of color samples or full containers (e.g., quart, gallon, five gallons) of paint; the identification of places to purchase such paint; the paint formulation itself; and the like. Using a color visualization tool, the color of interest can be visualized on a three dimensional representation of a manufactured article.

Accordingly, various embodiments directed to systems and methods for selecting a color from a database of digital color images are described herein. In an architectural color application, the color selection system provides a web-based system (e.g., using the Internet or another network) and a computer-implemented method for users to access and select colors and/or paint formulas. Color information can be stored in a database that includes high resolution digital representations (e.g., images) of color chips, panels or color swatches as well as additional information (e.g., metadata) pertaining to each color. The additional information can be used by a consumer to assist in color selection. The database of color images can be stored in a memory of a computer server or other type of processing device. In one embodiment, a web-based color search and formula retrieval tool provides a visual representation of color(s) on a display and associates the color(s) with relevant compatibility information for the purpose of quick and easy color identification and selection.

A computer or processor can perform the steps needed to implement the process in response to software instructions that are contained in a computer memory or in a compact disk, DVD, or other non-transitory computer readable medium.

Figure 1:
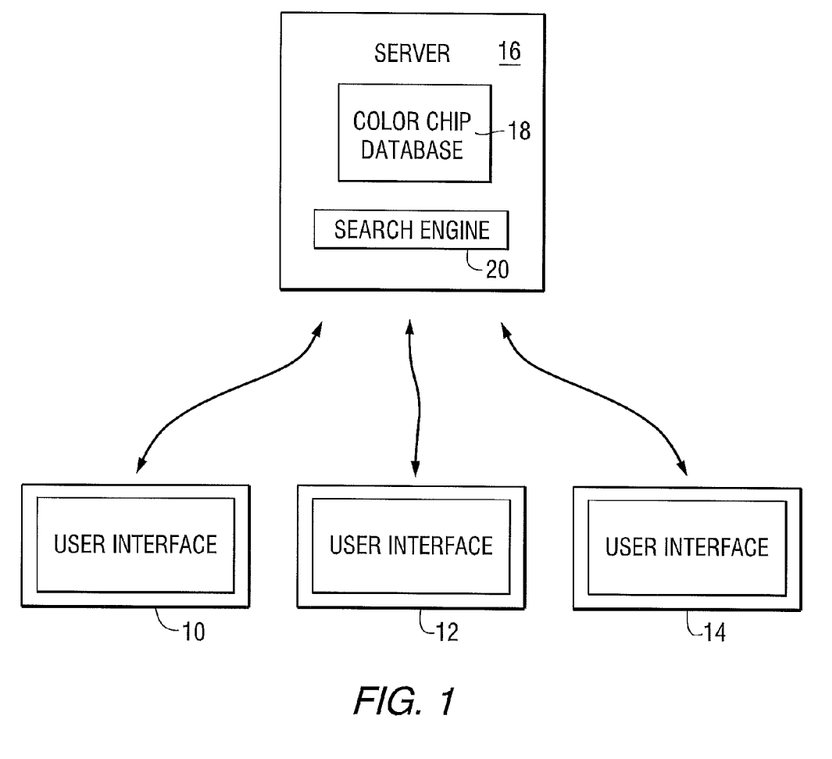
FIG. 1 is a schematic block diagram of a system that can be used to practice an embodiment of the invention.

FIG. 1 is a block diagram of one implementation of a system that can be used to select colors. In the example of FIG. 1, a plurality of users have access to a computer, terminal, tablet computer, smart phone, PDA, or other device 10, 12 or 14 having a user interface that allows the users to enter information and includes a display. The user device can communicate, for example, over the Internet or another network with a server, computer, or other information processing device or system 16 (hereinafter referred to as a server) including a memory 18 for storing a color chip database and a processor 20 configured with a search engine adapted to receive user requests and to search the database to obtain color information in response to the user requests. The user initiates a request at the user device and the request is transmitted to the server. The server searches the database to obtain information from the database. The search request can be transmitted using the known network protocols. The retrieved information is transmitted to the user and displayed at the user location. The retrieved information can be transmitted to the user device, for example, in an XML format, and can include image data in the form of images of color chips, panels or swatches. The system is not limited to any particular data transmission protocol or image format. The user device can use commercially available software to view the images.

When used in connection with an architectural color search, the system of FIG. 1 can provide a searchable web-based catalog of colors for which paint formulas are available. The database contains digital color images that can be linked to additional information identifying, for example, matching or coordinating colors, home décor items, paint purchase information, paint formulations, etc.

Figure 2:
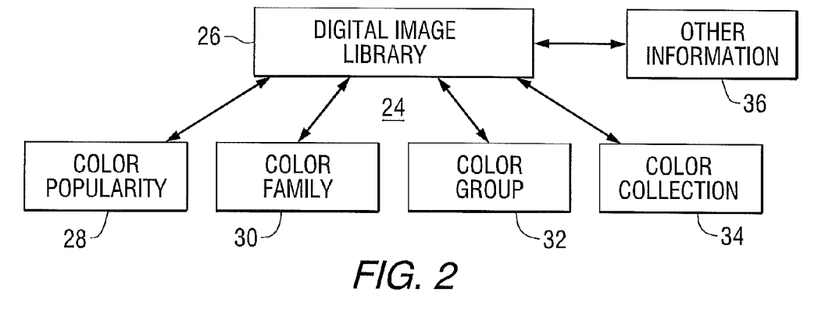
FIG. 2 is a schematic diagram of a database structure.

FIG. 2 is a schematic representation of the database structure. The database 24 includes a plurality of collections of information. The high resolution images can be stored in an image library 26. The images can be grouped in different "collections" and each "collection" can be further categorized by a set of descriptive data (metadata) that facilitates the selection of a color. A collection includes attribute descriptive data which relates to a digital image. More than one collection can be used to describe an image. By having multiple collections, a user can search using multiple criteria and retrieve the desired information quickly and accurately. A table of attribute descriptive data can be created for each image. For example, a search of digital images by color family will provide the user with the ability to search by other criteria and focus on a desired color.

Examples of the type of data that could be included are: a link to an online paint formulation database, and/or a link to color compatibility information. Such collections include a collection of colors by color popularity 28, a collection of colors by family 30, a collection of colors by group 32, and usage compatibility collections by color 34. Multiple collections can provide speed, a wide variety of search options, multiple search criteria and/or grouping information in one visual representation on a display.

In various embodiments, high quality digital images of colors can be captured and used in a searchable web-based catalog of the colors for which paint formulas are available. A web-based system provides a broad set of users with an easy solution to finding information relevant to available colors.

To populate the database with images, color images can be captured using a known (e.g., commercially available) image capture device such as but not limited to, a scanner or digital camera. The captured image may be processed using a known (e.g., commercially available) image processing software such as but not limited to, e.g., PhotoShop, to obtain a processed image. To perform the image processing, an editor can make decisions about if and how the image should be modified. Then the image can be modified in accordance with those decisions using the commercially available software. The final digital color image is then stored in the database. The images can be stored in several file formats, such as png, bmp, jpeg, gif, etc. images of color chips, panels or swatches. However, the images are not limited to any particular file format.

Figure 3:
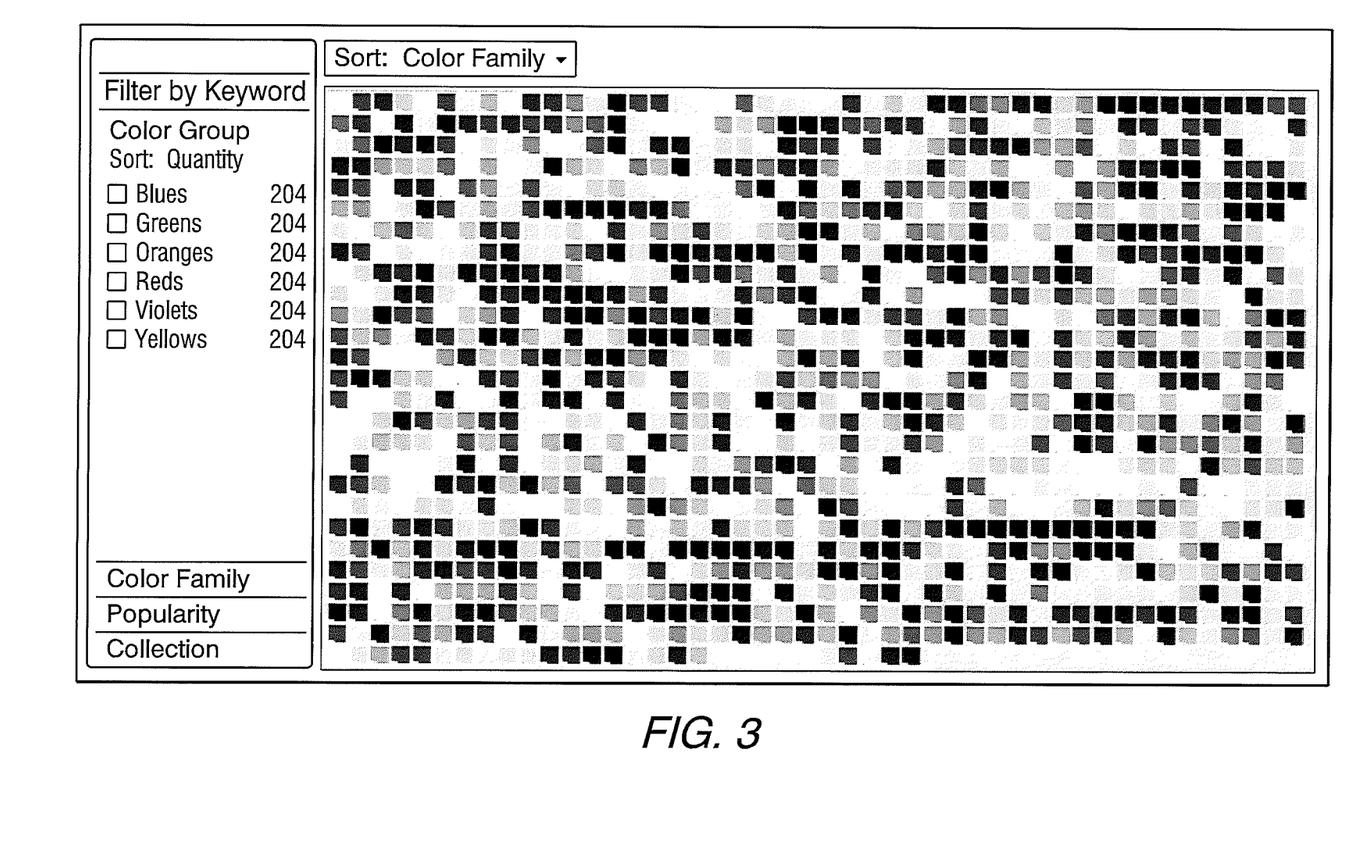
FIGS. 3-10 are representations of a screen displays.
Figure 4:
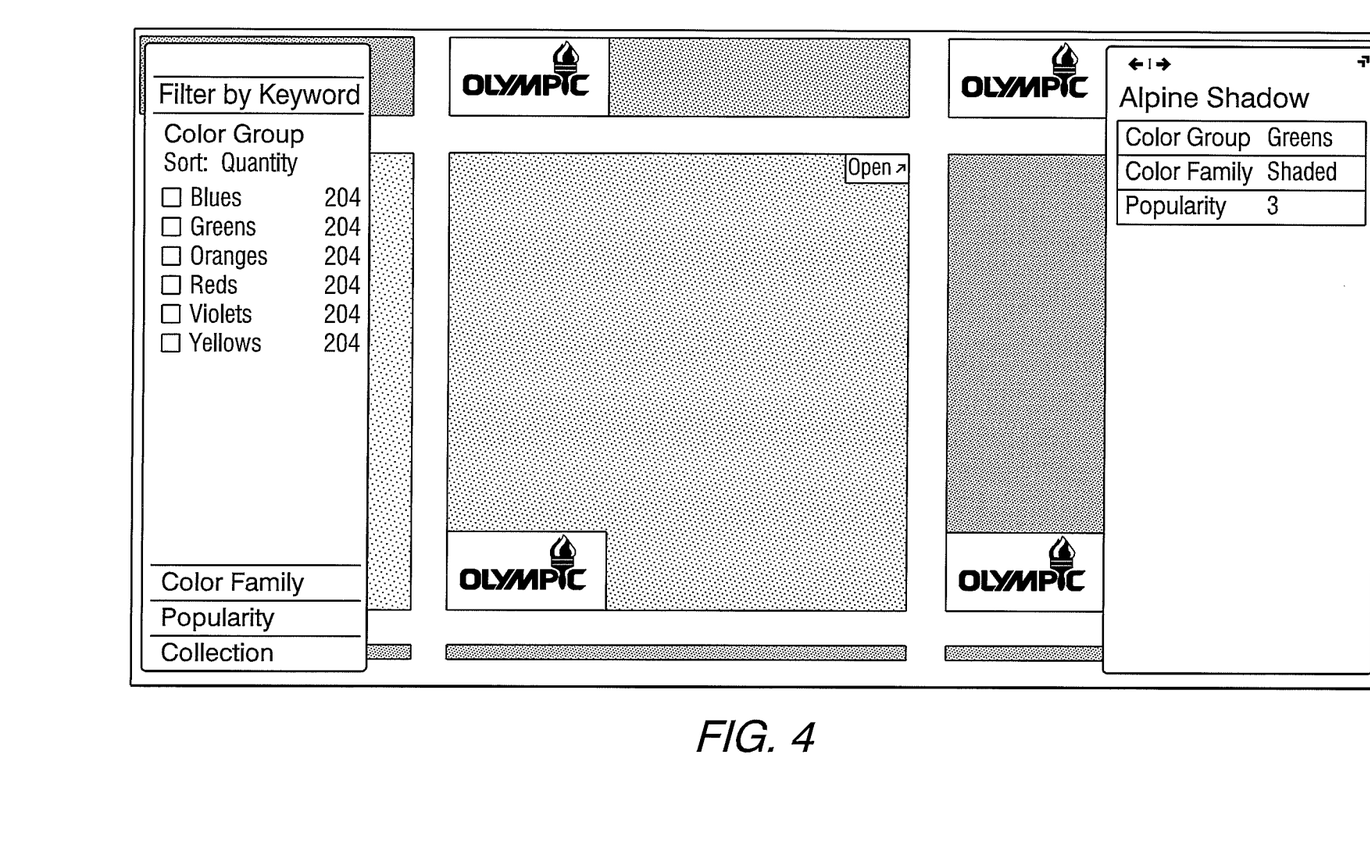
Figure 5:
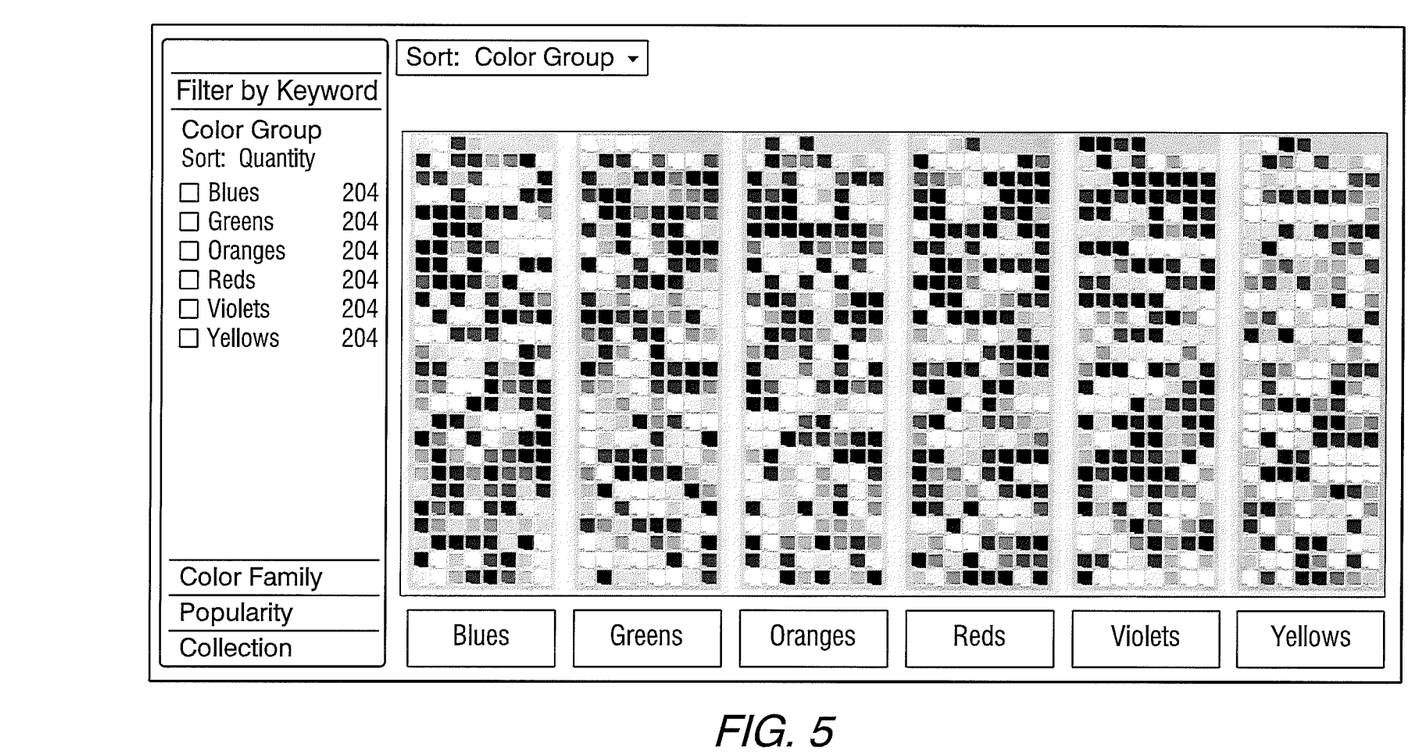
Figure 6:
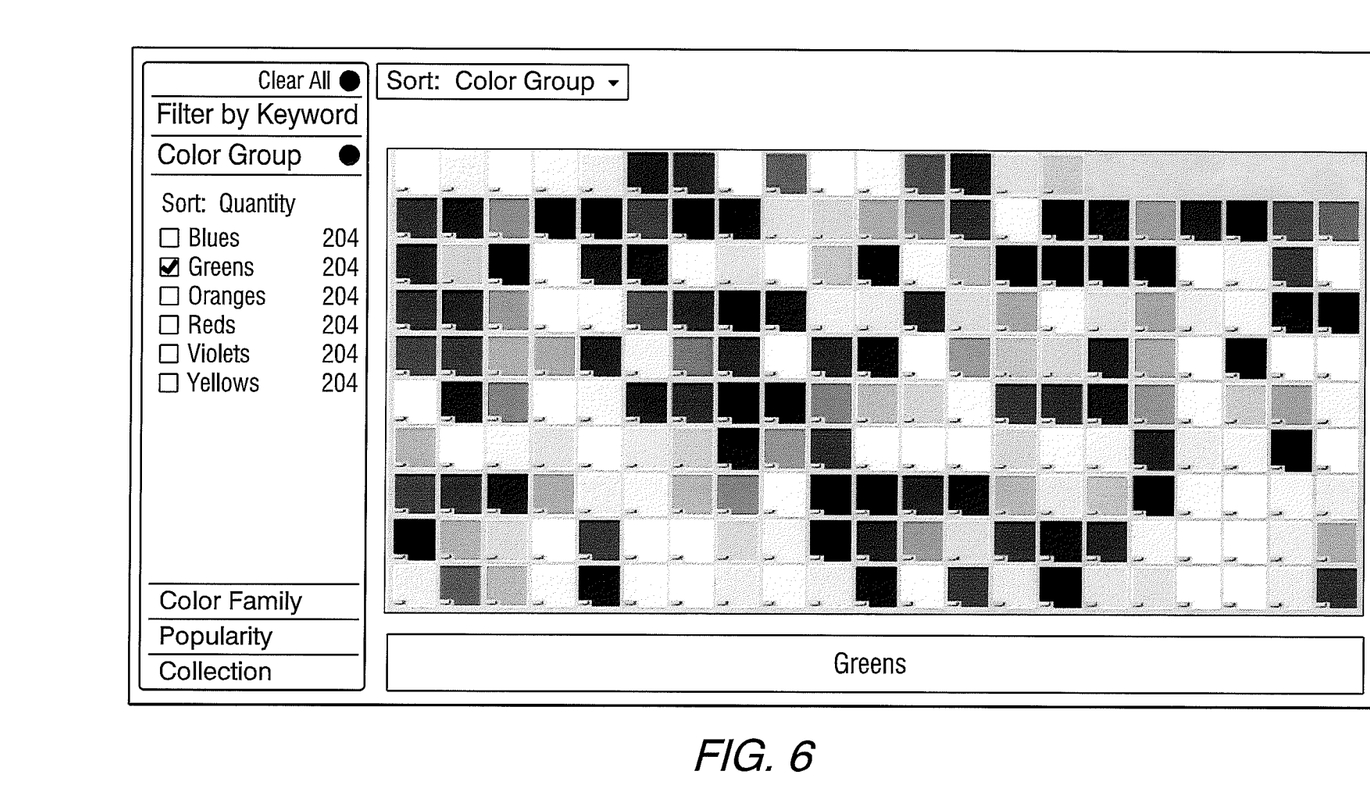
Figure 7:
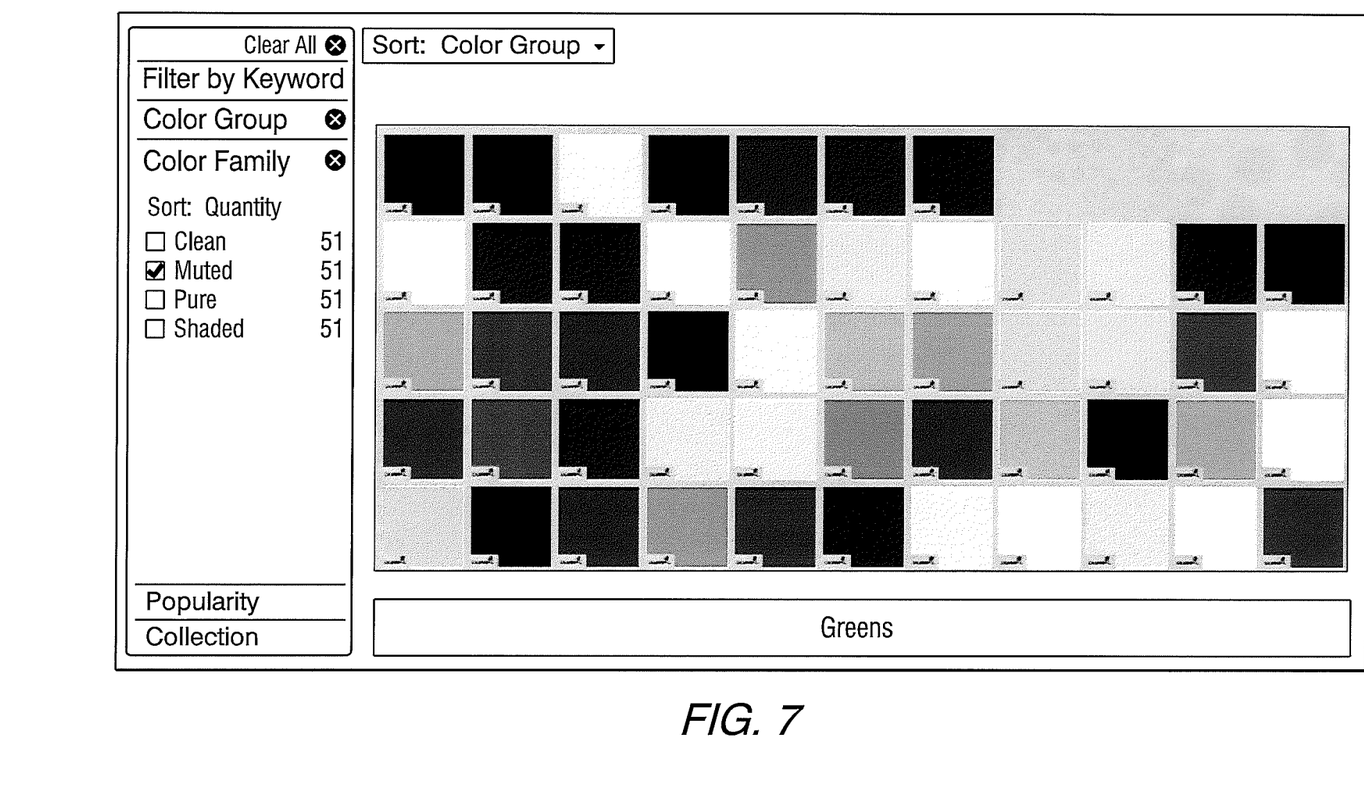
Figure 8:
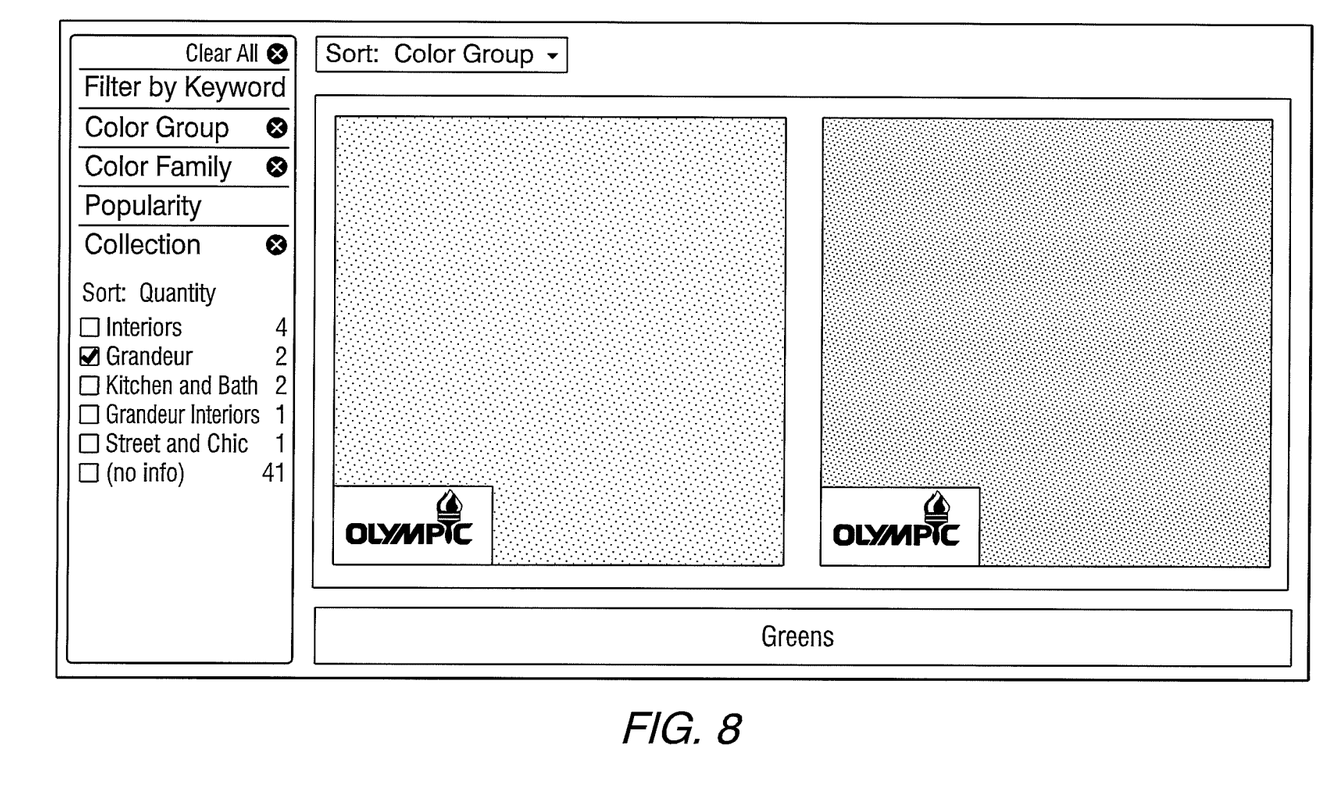
Figure 9:
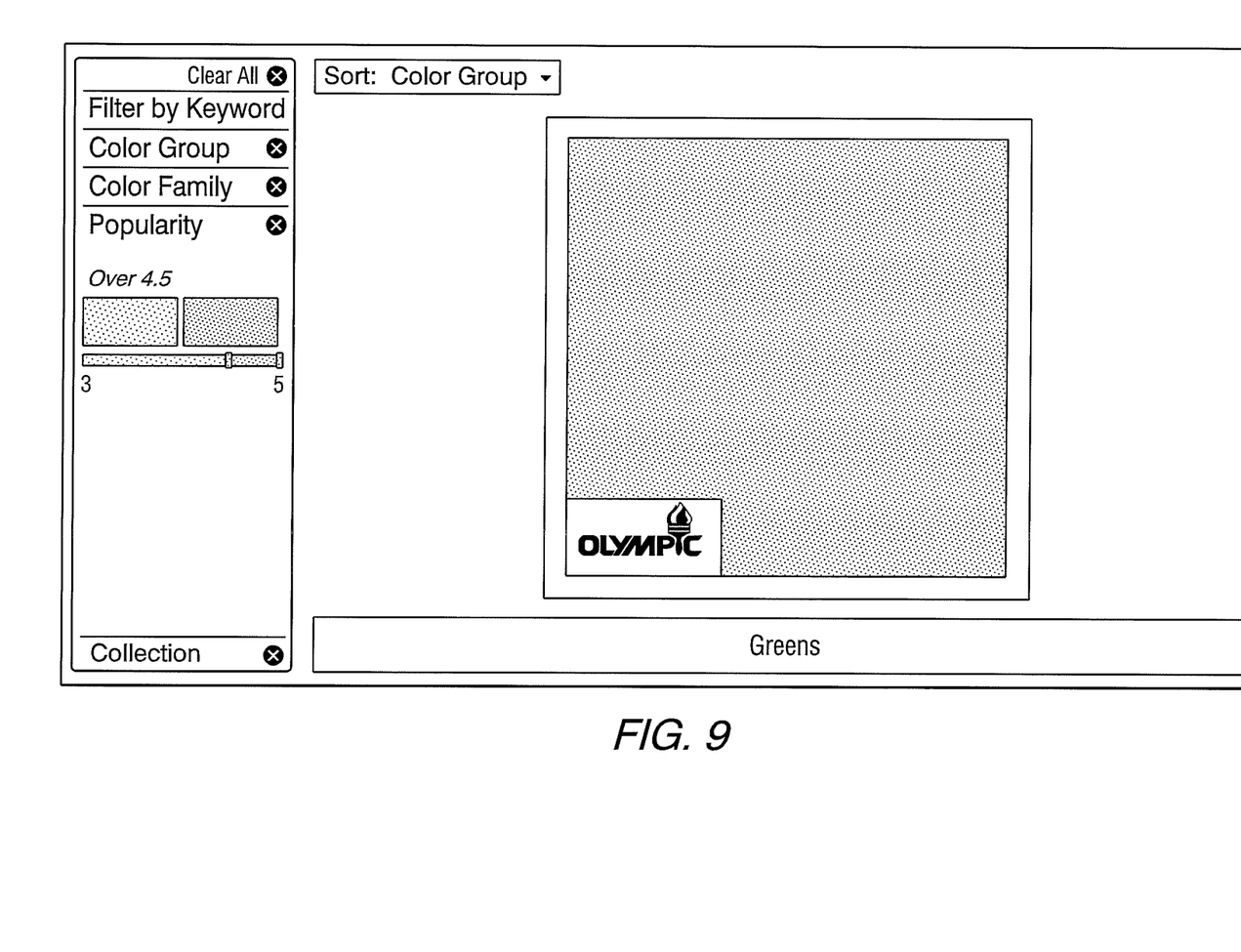
Figure 10:
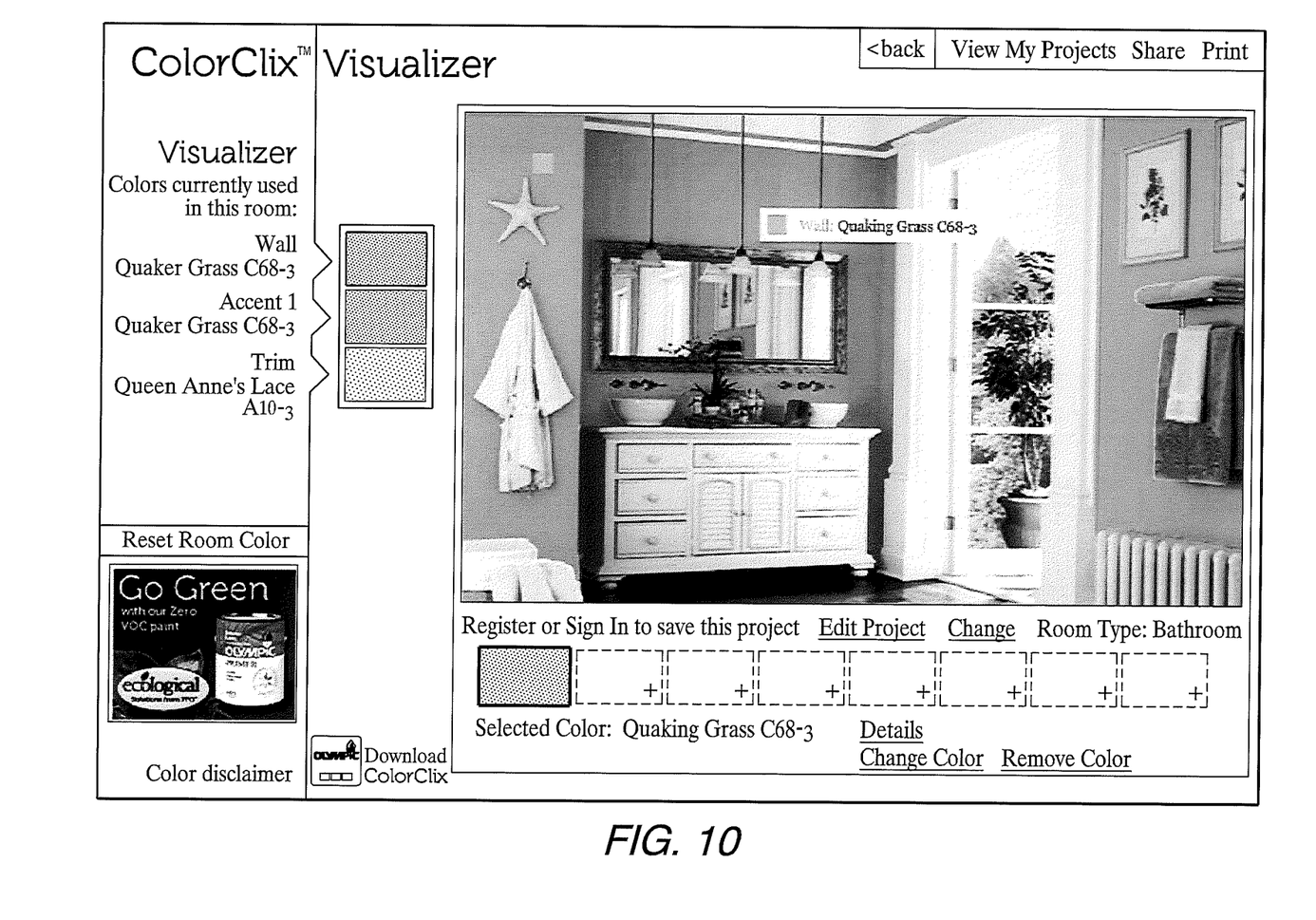

Generally, the database of color images/swatches can contain any number of different colors. Color information retrieved from the database can be displayed in various ways. For example, in one embodiment, a representation of the full set of color choices in a color family (e.g., a full color palette) can be displayed digitally, as shown in FIG. 3. Sort criteria are also displayed on the screen. A user can select various search criteria by clicking on buttons on the screen. The user can zoom in (e.g., via a mouse click on a thumbnail image) and select a color based solely on the color being displayed in FIG. 3 to produce the screen shown in FIG. 4, or the user can group colors on the screen by choosing sort criteria from a menu on the screen. FIG. 5 shows colors sorted by group, for example, blues, greens, oranges, reds, violets, or yellows. Once colors are sorted into groups, the colors in a particular group can be selected as shown in FIG. 6. These colors can be further sorted by characteristics such as clean, muted, pure, or shaded. FIG. 7 shows muted colors. A particular color from the muted colors in the green group can be selected as shown in FIG. 8. Then a screen showing the selected color and a popularity indication can be displayed as shown in FIG. 9. Next, the selected color can be visualized by inserting the color into an image, such as a room, as shown in FIG. 10. While the drawings show various patterns and shades of gray, it will be apparent that the patterns and shades in the drawings would actually be colors in a user's display device.

In the case of architectural paint colors, examples of search criteria could be: color family; color group; popularity and the color collections containing specific colors. As used in this description, "color collections" refers to two or more colors that are complementary or otherwise grouped together for use in designing and/or decorating.

Using the screens of FIGS. 3-9, the user can filter the color choices to a manageable set for further assessment such as color visualization (FIG. 10), paint sample ordering, or physical color chip review. Using various search criteria, the user can identify the color or colors of interest. Additional information (36 in FIG. 2) associated with the color(s) of interest can provide additional functionality. For example, the system might be used in combination with a paint formulator, and the color may be linked to a formulation database that provides a formula for a paint having a selected color. Alternatively or in addition, the selected color could be linked to information as to where to purchase a paint having such a color. Accordingly, aspects of the present invention are further directed to systems and methods for selecting a color from a database of color images and/or swatches, and further accessing additional information regarding the color.

In some embodiments, the systems/methods can include a color visualization tool, in which the selected color or colors can be visualized in a room as shown in FIG. 10, on a wall, or an appliance, cell phone and the like. In some examples, the user may upload and/or otherwise access an image of his or her own room or consumer item and depict the color on their own image. Architects and designers could use the tool to depict what a building, bridge or other structure will look like with the chosen color, as can a designer of motorcycles, airplanes, boats, cargo ships, buses, trains, and the like. Accordingly, other aspects of the present invention are further directed to systems/methods for selecting a color from a database of color images and/or swatches and visualizing the selected color on an image, which may be their own image or an image provided by the system.

Alternatively or in addition, in some embodiments the user can select a color and request to see the ancillary compatibility colors. Images of rooms or items having the selected color can be retrieved with the color name and paint formula.

The database can be searched by multiple queries, including but not limited to color family, color group, or color popularity. The search criteria and data are linked to the digital color images through the database. The system can be implemented using a variety of software platforms or web applications, such as but not limited to Microsoft Pivot.

Alternatively or in addition, in some embodiments the user can navigate an overall color palette to identify colors that are lighter or darker than a currently displayed color. The user can use an interface that permits the user to easily view colors that are chromatically arranged in color space that match the search criteria. This interface can resemble something similar to that of compass navigation that would enable the user to select a direction in color space that they would like to explore. Movement of a cursor on a display could be used to identify colors that are lighter or darker than a currently displayed color.

Alternatively or in addition, in some embodiments the user can specify a change in hue of the selected color, for example, that a color has more red, blue, etc. than a currently displayed color. Then the system would identify another color meeting the new criteria.

Alternatively or in addition, in some embodiments the user can share a selected color with others, such as friends and family, via a social networking site such as Facebook, or via Twitter or e-mail. This would enable the user to obtain confidence in their selection by receiving feedback on their color choice. For example, the user may click on a button or link that would enable them to share the color via social media and from there they would select their preferred networking method, such as Facebook, Twitter or email.

In one aspect, the system provides the ability to integrate high resolution images of colors with a collection of specific descriptive data related to the colors. This data can be presented to the user via a deep zoom graphical interface that enables the user to choose characteristics of the color in order to narrow the potential list of target colors. This system can also enable the user to quickly identify compatible colors that are associated with the selected color.

A software program can be used to display, search and sort the colors based upon the image information/metadata thereby enabling the users to focus less on the accuracy of the color on their monitor and more on the data about the specific color that they have in mind. This software program would enable the viewing of all colors in a specific color collection or palette; the zooming in and out of the palette to view specific colors; and the selection of specific criteria based upon the metadata that would result in the retrieval and displaying of only those colors meeting that criteria. In addition, once a specific color is identified, the software would enable the user to take one or more different actions based upon that color including: the visualization of that color using a color visualization software program; the display of the digital images for paints used on auxiliary components; and the identification of places to purchase paint, the paint formulation itself and the like. In one embodiment, Microsoft Silverlight software can be used to perform the search and display functions.

In one embodiment, the method includes the steps of displaying a plurality of digital images; inputting search criteria; searching a computer database for color images associated with the search criteria; determining a data set of colors that match that search criteria; and identifying the desired color in combination with additional data relating to the desired color.

In one embodiment, a web-based color search and formula retrieval tool provides a visual representation of colors on screen and associates the color with relevant compatibility information for the purpose of quick and easy color identification and selection.

A plurality of color images can be displayed on a monitor or other type of display device at the user's location. The user can enter various search criteria that can be used to identify one or more of the color images. For searches on color family, a feature can be deployed to create a chromatic array of color on screen.

Once the user selects the color, a paint brand code appearing on a screen can be selected to activate a link to a distributor locator application. By entering a postal zip code, the user can initiate a search for, and display of, the nearest paint distributor or store where the user can purchase the paint product. Alternatively or in addition, the user can easily migrate to an online color formulations site to access the color formula in the desired paint system or will be directed to the nearest distributor where they can purchase the required paint and ancillary products.

The screen can display a gray background for the digital color images. This design of the digital display takes into account the phenomena of "simultaneous contrast" and the "crispening effect." Simultaneous contrast causes an observer to perceive colors differently depending on what colors they are adjacent to, or surrounded by. The use of a gray background surrounding the digital color images displayed on a screen allows the human eye to calibrate to the digital color image better than digital color images presented on a white background. The crispening effect is a human visual system phenomenon that causes a change of perception to color differences due to changes in background color. A suitable method for displaying multiple digital color images is to keep a consistent gray background to avoid a change in perception due to a change in background color.

In another embodiment, the digital color image database may be used in conjunction with a mixing software platform to allow mixing the paint components in one application. The selected color displayed on screen as a digital color image can be used as a user selection button to activate a link to a color formulation website. This allows the user to go from a selected color image to the ancillary information about related colors and to access paint formulas that can then be mixed and sold.

Utilizing several search criteria, the user may narrow the identification and selection to a small group of digital color images. Selecting a digital color image can produce additional information about that color as well as compatible color information. Digital color images can be arranged chromatically for easier selection. Final selection can link the selected color image to a color formula retrieval tool. Alternatively, final selection can link to the nearest distributor/supplier to purchase the paint and ancillary products. Final selection may also link to additional technical information.

The method can further include displaying additional information including at least one of: a technical data sheet; a material safety data sheet (MSDS); ready to spray information (RTS); volatile organic compound (VOC) information; and product usage about the selected color.

The method can further include entering the selected color on a purchase order; displaying a link to a color formula retrieval tool; and/or displaying a link to a distributor or supplier where paint and/or ancillary products may be purchased.

The color selection method can be implemented using software such as Microsoft PIVOT, in combination with a database of the color images. A computer or processor can perform the steps needed to implement the process in response to software instructions that are contained in a computer memory or in a non-transitory computer readable medium.

As used herein, unless otherwise expressly specified, all numbers such as those expressing values, ranges, amounts or percentages may be read as if prefaced by the word "about," even if the term does not expressly appear. Any numerical range recited herein is intended to include all sub-ranges subsumed therein. Plural encompasses singular and vice versa. For example, while reference is made to "a" color, "a" color image/swatch, "a" formulation and the like, multiple colors, images, swatches or formulations can be selected and/or accessed. Words or phrases: "including," "such as," "for example" and like terms mean "including/such as/for example but not limited to."

While the invention has been described in terms of several embodiments, it will be apparent to those skilled in the art that various changes can be made to the described embodiments without departing from the scope of the invention.

We claim:

1. A computer implemented method performed by one or more processors when executing computer executable instructions for the method, wherein the computer-implemented method controls a user interface for a web-based color selection process comprising:

storing at a server memory a database of colors and metadata related to each of the colors, the metadata including for each color in the database at least color family, color group and color popularity information;

at a server processor configured with a search engine, receiving from an interface at a user device a request to search the database of colors;

in response to the received request, the server processor searching the database of colors and controlling the user interface by performing the following:

performing a first search of the database of colors at the server memory based on color family and displaying at the interface of the user device a set of color choices in a color family, along with sort criteria for color family, color group and color popularity;

based on selecting at the interface sort criteria for one or more color groups for the color family, the server processor performing a second search and grouping the color family into one or more subsets of color groups, and displaying at the interface at least one color group, along with said sort criteria;

selecting at the interface at least one color from a displayed color group, and displaying at the interface the at least one selected color, and then selecting the color popularity sort criteria         the server processor then performing a third search and displaying color popularity at the interface for the at least one selected color;

receiving additional requests at the server processor and the server processor performing the first, second and third searches of the database for additional colors and displaying at the interface one or more additional colors;

selecting at the interface a color of interest from the at least one selected color and the one or more additional colors which resulted from the searching performed by the server processor; and     displaying an image of the color of interest against a gray background that accounts for simultaneous contrast and crispening effect.

2. The computer-implemented method of claim 1, wherein the database includes additional information which comprises colors that have been preselected to coordinate with other colors and displaying the additional information for at least one selected color of interest.

3. The computer-implemented method of claim 2, wherein the additional information further comprises selected images illustrating how the selected color of interest has been previously used.

4. The computer-implemented method of claim 3, further comprising displaying at the user interface the at least one selected image illustrating how the selected color of interest has been previously used.

5. The computer-implemented method of claim 2, wherein the additional information further comprises digital representations of matching or coordinating home decor items.

6. The computer-implemented method of claim 1, further comprising sharing a selected color of interest by using a social networking site or e-mail.

7. The computer-implemented method of claim 1, wherein the set of color choices displayed for a color family is chromatically displayed.

8. The computer-implemented method of claim 1, further comprising displaying at the user interface at least one selected color interest using a color visualization software program.

9. The computer-implemented method of claim 8, wherein the color visualization software program includes a color visualization tool which permits, a selected color of interest to be visualized on a three dimensional representation.

10. The computer-implemented method of claim 1, further comprising displaying at the user interface purchasing information for at least one selected color of interest.

11. The computer-implemented method of claim 10, wherein the purchasing information includes information identifying one or more places to purchase paint in at least one selected color of interest.

12. The computer-implemented method of claim 10, wherein the purchasing information includes an on-line purchase order.

13. The computer-implemented method of claim 1, further comprising displaying at the user interface information for a paint formulation for at least one selected color of interest.

14. The computer-implemented method of claim 13, wherein the information for a paint formulation includes a link to a color formula retrieval tool.

15. The computer-implemented method of claim 1, wherein the executable instructions are provided on one or more computer readable hardware storage devices.

16. A computing system comprising:
a user device containing one or more processors and having a display for use with an interface;
a server computing system comprising one or more processors, and a memory containing computer executable instructions which, when executed by the one or more processors, cause the one or more processors to perform a computer-implemented method for controlling the user interface at the user device when used for a web-based color selection process, and the computer-implemented method comprising:
storing at a server memory a database of colors and metadata related to each of the colors, the metadata including for each color in the database at least color family, color group and color popularity information;
at a server processor configured with a search engine, receiving from an interface at a user device a request to search the database of colors;
in response to the received request, the server processor searching the database of colors and controlling the user interface by performing the following:
performing a first search of the database of colors at the server memory based on color family and displaying at the interface of the user device a set of color choices in a color family, along with sort criteria for color family, color group and color popularity;
based on selecting at the interface one or more color groups for the color family, the server processor performing a second search and grouping the color family into one or more subsets of color groups, and displaying at the interface at least one color group, along with said sort criteria;
selecting at the interface at least one color from a displayed color group, and displaying at the interface the at least one selected color, and then selecting the color popularity sort criteria;
the server processor then performing a third search and displaying color popularity at the interface for the at least one selected color;
receiving additional requests at the server processor and the server processor performing the first, second and third searches of the database for additional colors and displaying at the interface one or more additional colors;
selecting at the interface a color of interest from the at least one selected color and the one or more additional colors which resulted from the searching performed by the server processor; and
displaying an image of the color of interest against a gray background that accounts for simultaneous contrast and crispening effect.

17. The computing system of claim 16, wherein the database includes additional information which comprises colors that have been preselected to coordinate with other colors and displaying the additional information for at least one selected color of interest.

18. The computing system of claim 17, wherein the additional information further comprises selected images illustrating how a selected color of interest has been previously used.

19. The computing system of claim 18, wherein the additional information further comprises digital representations of matching or coordinating home decor items and displaying the additional information for at least one selected color of interest.

20. The computing system of claim 19, wherein the computer-implemented method further comprises displaying at the user interface at least one of the selected images illustrating how a selected color of interest has been previously used and the digital representations of matching or coordinating home décor items.

21. The computing system of claim 16, wherein the set of color choices displayed for a color family is chromatically displayed.

22. The computing system of claim 16, wherein the computer-implemented method further comprises displaying at the user interface at least one selected color of interest using a color visualization software program.

23. The computing system of claim 22, wherein the color visualization software program includes a color visualization tool which permits the at least one selected color of interest to be visualized on a three dimensional representation.

24. The computing system of claim 16, wherein the computer-implemented method further comprises displaying at the user interface purchasing information for at least one selected color of interest.

25. The computing system of claim 24, wherein the purchasing information includes an on-line purchase order.

26. The computing system of claim 24, wherein the purchasing information includes information identifying one or more places to purchase paint in the at least one selected color of interest.

27. The computing system of claim 16, further comprising displaying at the user interface information for a paint formulation for at least one selected color of interest.

28. The computing system of claim 27, wherein the information for a paint formulation includes a link to a color formula retrieval tool.

29. The computing system of claim 16, wherein the computer-implemented method further comprises identifying and displaying a color that is related to at least one selected color of interest but is lighter or darker than the at least one selected color of interest.

30. The computing system of claim 16, wherein the computer-implemented method further comprises identify and displaying a color that is related to at least one selected color of interest but has a different hue than the at least one selected color of interest.

* * * * *